(12) United States Patent
Cinotti (10) Patent No.: US 11,227,694 B2
(45) Date of Patent: Jan. 18, 2022

(54) NUCLEAR REACTOR WITH A SELF-SUPPORTING CORE

(71) Applicant: Luciano Cinotti, Recco (IT)

(72) Inventor: Luciano Cinotti, Recco (IT)

( * ) Notice: Subject to any disclaimer, the term of this patent is extended or adjusted under 35 U.S.C. 154(b) by 383 days.

(21) Appl. No.: 16/097,472

(22) PCT Filed: May 4, 2017

(86) PCT No.: PCT/IB2017/052606
§ 371 (c)(1),
(2) Date: Oct. 29, 2018

(87) PCT Pub. No.: WO2017/191593
PCT Pub. Date: Nov. 9, 2017

(65) Prior Publication Data
US 2019/0189296 A1    Jun. 20, 2019

(30) Foreign Application Priority Data
May 4, 2016  (IT) .......................... 102016000045589

(51) Int. Cl.
*G21C 3/33*  (2006.01)
*G21C 19/19* (2006.01)
(Continued)

(52) U.S. Cl.
CPC ............... *G21C 3/331* (2013.01); *G21C 1/14* (2013.01); *G21C 3/10* (2013.01); *G21C 3/33* (2013.01);
(Continued)

(58) Field of Classification Search
CPC . G21C 1/03; G21C 1/022; G21C 3/02; G21C 3/04; G21C 3/14; G21C 3/33;
(Continued)

(56) References Cited

U.S. PATENT DOCUMENTS 3,014,856 A * 12/1961 Nicklas ................. G21C 19/02
250/515.1
3,398,050 A *  8/1968 Yevick .................... G21C 5/06
376/171
(Continued)

FOREIGN PATENT DOCUMENTS

GB        1202920 A    8/1970
GB        1519546 A    8/1978
(Continued)

OTHER PUBLICATIONS

Italian Application No. GE2015A000036 filed Jul. 13, 2016.
(Continued)

*Primary Examiner* — Jack W Keith
*Assistant Examiner* — Joshua C Devorkin
(74) *Attorney, Agent, or Firm* — Dorsey & Whitney LLP (57) ABSTRACT

A nuclear reactor is provided that comprises a vessel that houses a core, comprising a bundle of fuel elements, and immersed in a primary cooling fluid of the core; the fuel elements extend along respective longitudinal and parallel axes and are mechanically supported by respective heads joined to each other and joined to an anchoring structure by support devices acting between adjacent fuel elements, or acting between fuel elements situated on the periphery of the core and the anchoring structure, and which constitute an integral part of the heads of the fuel elements.

14 Claims, 6 Drawing Sheets

(51) Int. Cl.
  *G21C 5/10* (2006.01)
  *G21C 1/14* (2006.01)
  *G21C 3/10* (2006.01)
  *G21C 1/03* (2006.01)
(52) U.S. Cl.
  CPC ............... *G21C 5/10* (2013.01); *G21C 19/19* (2013.01); *G21C 1/03* (2013.01); *Y02E 30/30* (2013.01)
(58) Field of Classification Search
  CPC .......... G21C 5/02; G21C 5/06; E05B 65/006; E05B 65/5246; E05B 65/5253; B65D 7/00; B65F 1/1615
  See application file for complete search history.

(56) References Cited

U.S. PATENT DOCUMENTS

| | | | | |
|---|---|---|---|---|
| 3,661,708 A * | 5/1972 | Friedland | ................ | G21C 7/30 376/261 |
| 4,131,510 A * | 12/1978 | Cooper | ................... | G21C 7/30 376/302 |
| 4,851,186 A * | 7/1989 | Berte | ...................... | G21C 5/06 376/364 |
| 6,310,931 B1 * | 10/2001 | Gustafsson | ........... | G21C 3/331 376/440 |
| 2010/0290579 A1 * | 11/2010 | Cinotti | .................... | G21C 5/06 376/403 |

FOREIGN PATENT DOCUMENTS

| | | | | |
|---|---|---|---|---|
| JP | 02151791 A | 6/1990 | | |
| JP | 06051078 A | 2/1994 | | |
| WO | WO-9003647 A1 * | 4/1990 | ............... | G21C 5/06 |
| WO | WO-2012097029 A1 * | 7/2012 | ............. | G21C 3/334 |

OTHER PUBLICATIONS

Italian Application No. MI2008A000766 filed Nov. 3, 2008.
International Search Report and Written Opinion for International Application No. PCT/IB2017/052606 dated Aug. 23, 2017.

* cited by examiner

NUCLEAR REACTOR WITH A SELF-SUPPORTING CORE

TECHNICAL FIELD

The present invention relates to a nuclear reactor, in particular a nuclear reactor formed by a number of fuel elements characterized by a support system of new conception.

STATE OF THE PRIOR ART

Under current practice, nuclear reactors include a core, positioned in the lower part of the main vessel of the reactor, immersed in the primary fluid and formed by fuel elements supported by a support grid.

Reactors using known solutions have various drawbacks.

The core support grid is usually anchored to the bottom of the reactor vessel and is difficult to inspect and difficult/impossible to replace, and so it is necessary to limit damage caused by neutron flux. To this end, each fuel element extends in length beneath the active part so as to reduce damage to the support grid.

In the particular case of using heavy liquid metals as the primary coolant, there is a serious floating effect that requires complicated anchorage of the fuel elements to their support grid and/or balancing with the use of high-density materials, such as tungsten.

Patent application MI2008A000766 attempts to answer this problem by adopting a support structure at the top end instead of the bottom end of the fuel element, resorting to a structure with beams passing through penetrations made in the shell containing the reactor and on which they rest, and in which each beam of the support structure supports a row of fuel elements, passing through them in a slot located below the head of the element.

This solution has the limitation of only being usable with square pattern fuel elements, and has various drawbacks when the penetrations pass through the primary confining barrier and the need for two sets of sliding beams to allow detachment of the fuel element to be replaced, said sets of beams being bulky and potentially interfering with the other structures located in the upper part of the reactor.

SUBJECT OF THE INVENTION

One object of the present invention is to provide a nuclear reactor that overcomes the indicated drawbacks of known solutions and has further constructional and safety advantages.

The present invention thus relates to a nuclear reactor, as defined in the appended claim 1 and, for its auxiliary characteristics and plant configurations, in the dependent claims.

BRIEF DESCRIPTION OF DRAWINGS

The invention is described in the following non-limitative embodiment, referring to the figures of the accompanying drawings, in which.

PREFERRED EMBODIMENT OF THE INVENTION

Figure 1:
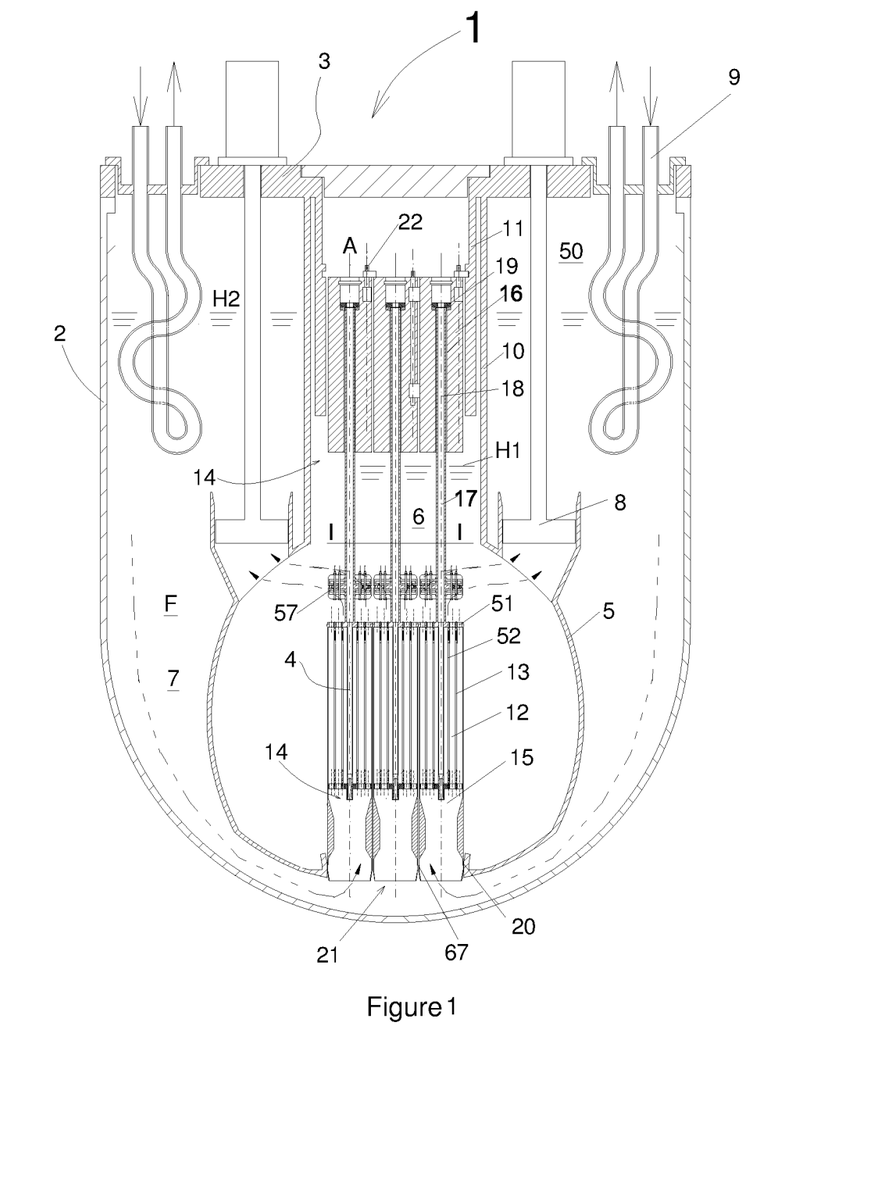
FIG. 1 is a schematic overall view in longitudinal section of a nuclear reactor according to the invention.

Referring to FIG. 1, particularly representative of a liquid-metal or molten salt cooled nuclear reactor 1, the nuclear reactor 1 comprises a substantially cup or pool-shaped vessel 2 and a closure structure 3 placed on top of the vessel 2; the vessel 2 contains a core 4 and a hydraulic separation structure 5 delimiting a hot manifold 6 and a cold manifold 7 in which a primary cooling fluid F of the core 4 circulates. The primary fluid F has a free surface that in normal operation of the reactor 1 is at different levels H1 and H2 in the manifolds 6 and 7. The vessel 2 houses circulating pumps 8 for the primary fluid F, heat exchangers 9 through which the primary fluid F passes and which transfer the power generated in the core 4 to a secondary fluid, as well as other known components that are not shown.

The hydraulic separation structure 5 preferably has an amphoralike shape, according to the solution known from patent application GE2015A000036, and is suspended from the closure structure 3 of the vessel 2.

Figure 2:
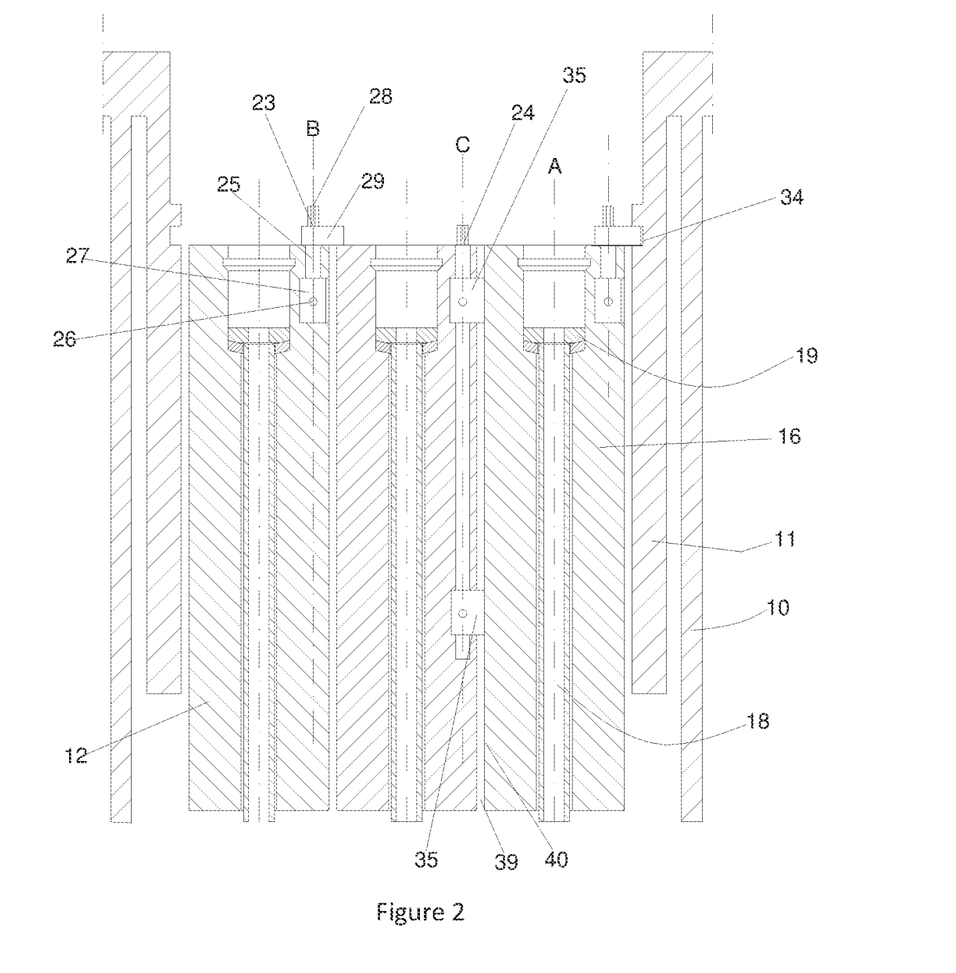
FIG. 2 is an enlarged schematic view in longitudinal section of the support system of the fuel elements in FIG. 1.
Figure 3:
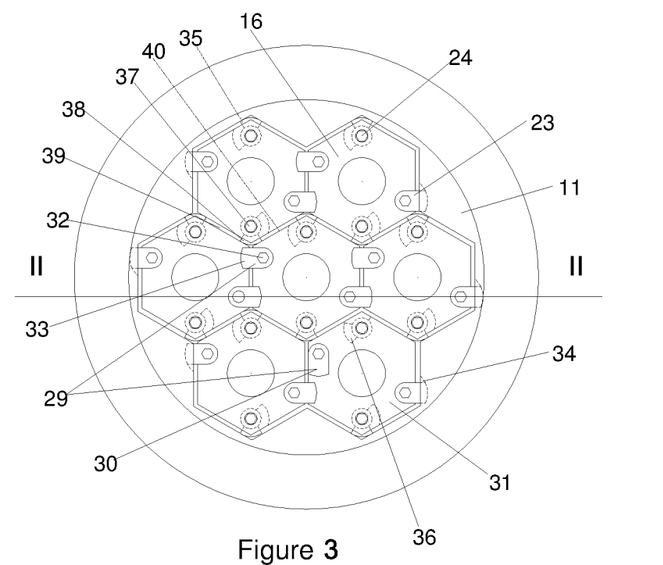
FIG. 3 is a schematic top view of the support system of the fuel elements in FIG. 2.

Referring to FIGS. 2 and 3 as well, an anchoring structure 11 for the fuel elements 12 is inserted inside the upper part 10 of the hydraulic separation structure 5.

The fuel elements 12 extend along respective longitudinal and parallel axes (A) and have respective active parts 13 and respective service parts 14, which comprise a foot 15 and a head 16, respectively at the bottom and the top, and a connection shaft 17 between the active part 13 and the head 16.

The shaft 17 possesses a certain amount of mechanical flexibility and is inserted with its upper portion 18 in an empty cylindrical volume inside the head 16 of the fuel element 4. This upper portion 18 is mechanically coupled to the head 16 by a spherical coupling 19, not described in detail as it is current technology, located at its top end.

The feet 15 of the fuel elements 12 are in contact with each other and, as a whole, constitute a bundle that is radially constrained by the inner rim 20 of the opening 21 on the bottom of the hydraulic separation structure 5.

The head 16 of the fuel element 12 houses support devices 22, in particular two vertical support devices 23, close to two opposite corners of the hexagonal section of the head 16, and two horizontal support devices 24, close to another two opposite corners of the head 16.

The vertical support devices 23 are constituted by a substantially cylindrical main body 25 with the bottom end connected by a pin 26 to a vertically locking hollow cylindrical element 27. The main body 25 of the support element terminates at the top with a hexagonal head 28 and comprises a latch 29.

The vertical support devices 23 can rotate approximately 90° about their own axis B, to move to a closed position 30 in which their projection on a horizontal plane is entirely contained inside the projection 31 of the head 16 of the fuel element 12, or to an open position 32, shown by all the other vertical support devices 23 in FIG. 3, in which the latch 29 protrudes for the projection. 31 of the head 16 of the fuel element 12 it belong to, bringing its tip 33 over the adjacent fuel element 12 or, as regards the peripheral devices of peripheral fuel elements 12 of the core, engaging a slot 34 made in the anchoring structure 11 of the fuel elements 12. The vertical support devices 23 belonging to the fuel element 12 in open position 32 prevent downwards movement of the fuel element 12 that, with said latches 29 open, rests on the adjacent fuel elements 12. The vertical support devices 23 that project out from adjacent fuel elements 12 over a given fuel element 12 prevent upward movement of that fuel element 12. With all the support devices 23 in the open position, the core 4 appears to be a single block in which no fuel element 12 can move up Or down with respect to the others. Furthermore, the vertical support devices 23 that are in a peripheral position of the core and in the open position, and which engage with the slots 34 in the anchoring structure 11 of the fuel elements 12, prevent vertical movement of the entire core 4.

The horizontal support devices 24 are also of a substantially cylindrical shape and are characterized by at least two cams 35 and can rotate more than 90° about their own axis C, from a closed position 36, in which their projection on a horizontal plane is entirely contained inside the projection 31 of the head 16 of the fuel element 12, to an open position 37, shown by all the other horizontal support devices 24 in FIG. 3, in which the cam 35 protrudes from said projection 31 to bring an end tip 38 past the gap 39 between the heads 16 of the fuel elements 12, up to make contact with two heads 16, in particular contact with one of their faces 40 or, as regards the peripheral fuel elements 12, contact with the anchoring structure 11 of the fuel elements 12.

The vertical support devices 23 perform the described vertical constraint function of the fuel elements, and the horizontal support devices 24 perform, as a whole, the radial constraint function of the heads 16 of the fuel elements when a gap 39 is provided between them.

With all the support devices 22 in the open position, the core appears as a single block anchored vertically and radially to the anchoring structure 11.

Figure 4:
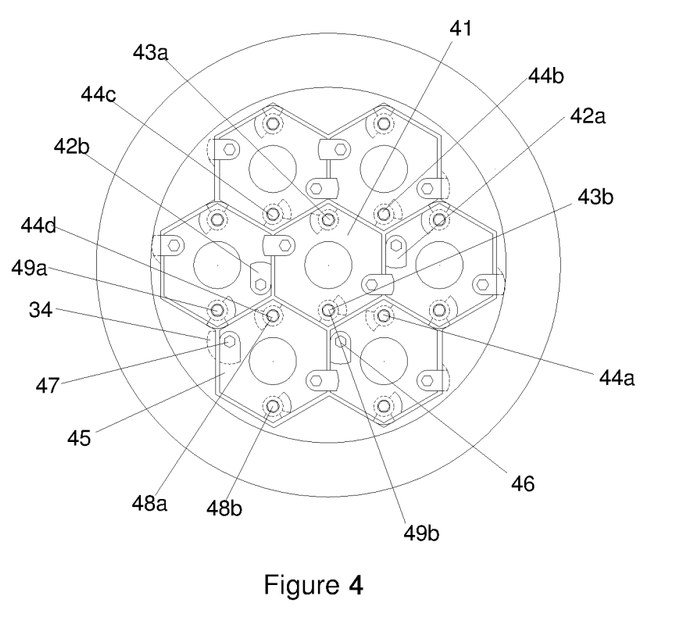
FIG. 4 is a top view of the support system of the fuel elements in FIG. 2 showing a fuel element disengaged for carrying out its replacement.

Referring to FIG. 4, the extraction of a generic internal fuel element 41 of the core can be performed: (i) upon closing the two vertical support devices 42a and 42b belonging to adjacent fuel elements, (ii) upon closing the two horizontal support devices 43a and 43b belonging to the fuel element 41 in question, and (iii) upon closing the four support devices 44a, 44b, 44c and 44d belonging to four adjacent elements.

The extraction of a generic external fuel element 45 of the core can be performed: (i) upon closing a vertical support device 46 belonging to an adjacent element, (ii) upon closing its own vertical support device 47 that is engaged in the slot 34 made in the support structure 11 of the fuel elements 12, (iii) upon closing the two horizontal support devices 48a and 48b belonging to the fuel element 45 in question, and (iv) upon closing the two horizontal support devices 49a and 49b belonging to two adjacent elements.

The rotation limits for closing and opening the horizontal support devices 24 can be determined from the shape of the slots 34 occupied by the latches on the head 16 of the elements 12.

The opening and closing of the support devices 22 can be performed by acting on the hexagonal head 28 via the grippers of the fuel transfer machine or via a specially provided device or remote manipulator, not shown because part of normal technology.

With a similar procedure of extraction and insertion, it is also possible to perform a 180° rotation of the fuel element. That envisaged for the support of the fuel element may conveniently be applied to other components inserted in the core, such as control rods.

Figure 5:
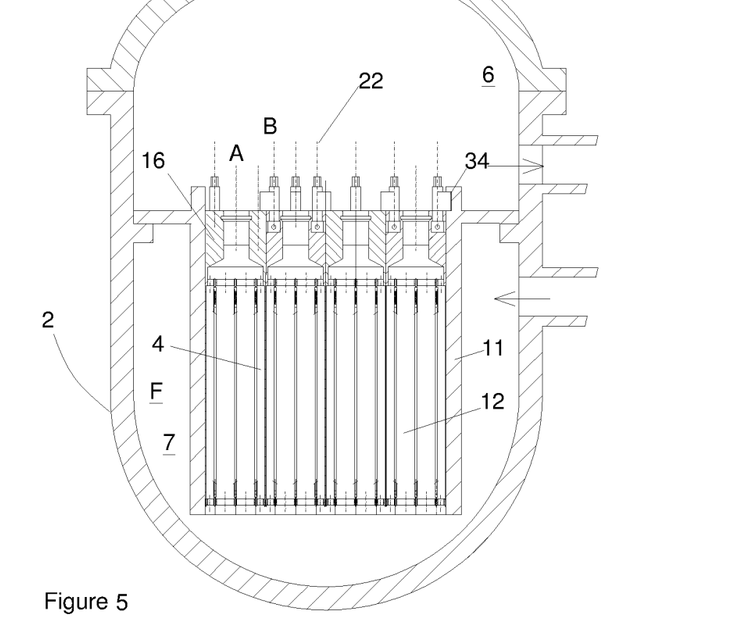
FIG. 5 is a schematic overall view in longitudinal section of a variant of the nuclear reactor with a support system for the fuel elements according to the invention.
Figure 6:
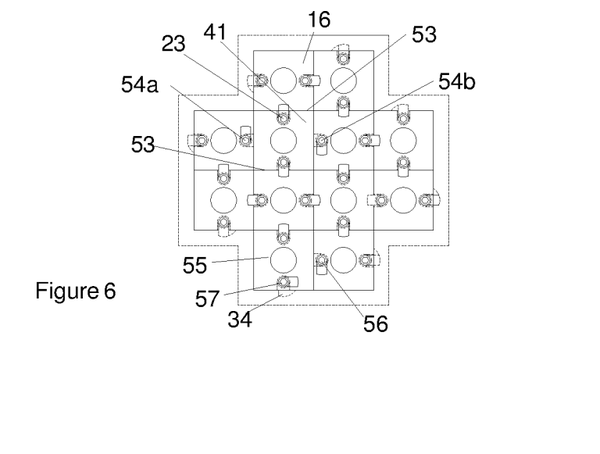
FIG. 6 is a top view of the support system of the fuel elements in FIG. 5.

Referring to FIGS. 5 and 6, where FIG. 5 is mainly representative of a water cooled reactor and where elements with similar functions are indicated with the same reference numerals used in FIGS. 1-4, less stringent requirements allow simplifying the support system of the fuel elements 12; in particular, the fuel elements 12 can have a square section and less stringent gap control, without requiring particular flexibility of the fuel elements 12 for recovering from deformation or differential expansion.

Support for fuel elements 12 can be implemented with the use of just two vertical support devices 23 for each fuel element 12, preferably placed close to the centre line of two opposite sides 53 of the head 16; the support structure 11 may also provide a hydraulic separation function between hot manifold 6 and cold manifold 7.

The replacement of a generic fuel element 41 inside the core is performed upon closing two vertical support devices 54a and 54b, respectively belonging to adjacent elements 12. The replacement of a generic fuel element 55 located on the periphery of the core is performed: (i) upon closing a vertical support device 56 belonging to an adjacent fuel element 12, and (ii) upon closing its own vertical support device 57 that is engaged in the slot 34 made in the support structure 11 of the fuel elements 12.

Figure 7:
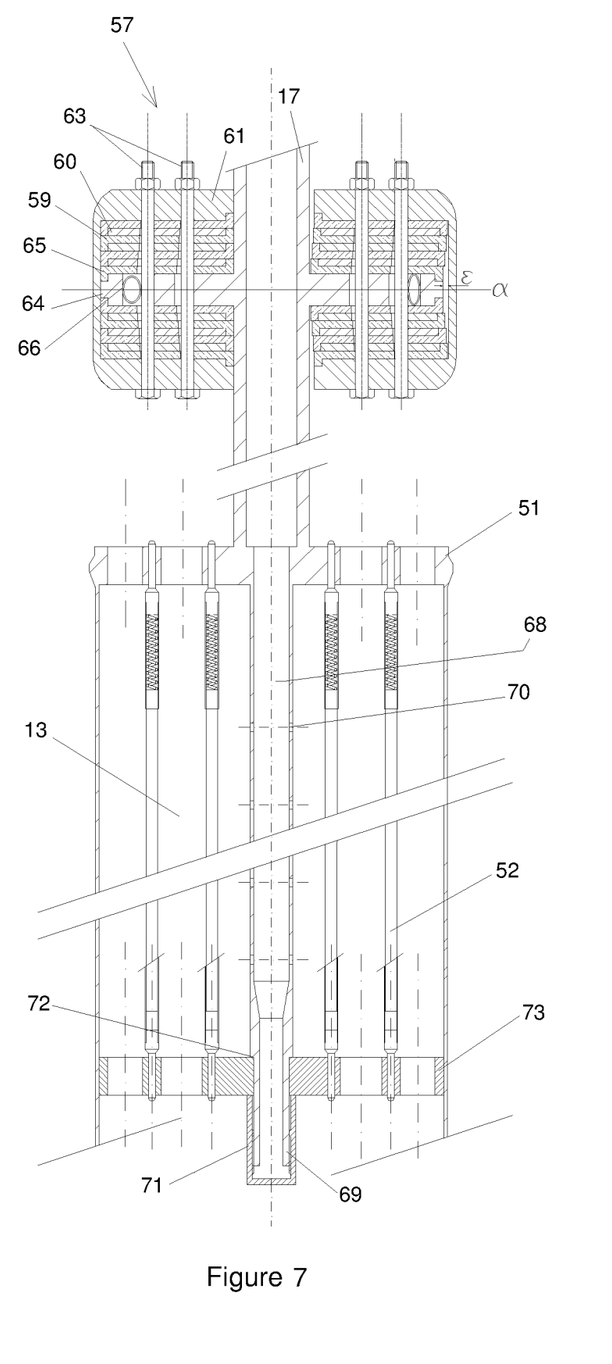
FIG. 7 is an enlarged view, not to scale and in longitudinal section, of portions of the fuel element showing, in particular, the radial expansion devices and the active part of the core in FIG. 1.
Figure 8A:
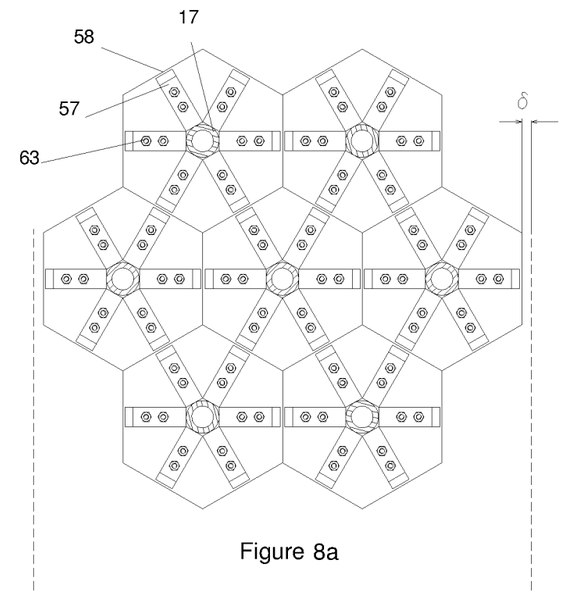
FIGS. 8a and 8b show a schematic view in cross-section along the line I-I of the fuel elements in FIG. 1, respectively with the active parts of the fuel elements adjacent or set apart.
Figure 8B:
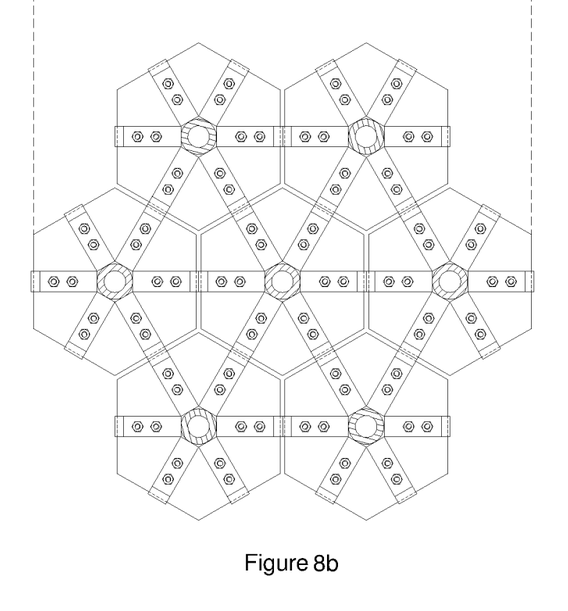

Referring to FIGS. 1, 7, 8a and 8b, expanders 57, characterized by an increased capacity of radial expansion with temperature and of which an embodiment is shown in FIG. 7, are applied to the shaft 17 of the fuel elements 12.

Each shaft 17 is fitted with six expanders 57, each extending perpendicular to a respective face 58 of the fuel element 12. Each expander 57, which is symmetrical with respect to a centre-line plane a perpendicular to the shaft 17 for improved structural performance, is constituted by a plurality of Z-shaped section low thermal expansion elements 59, alternating with high thermal expansion elements 60 of parallelepiped shape.

The U-shaped closing element 61 is also made of a material with a high coefficient of thermal expansion, with two bolts 63 axially constraining the elements constituting the expander 57 and preventing disassembly.

The shaft 17 is provided with a radial extension 64 on which the radial tip 65 of the innermost element 59 engages, on the inner radial end of which an element 60 engages, on the outer radial end of which a second element 59 engages in turn, and so on.

Following an increase in temperature, elements 60 expand more than the structurally adjacent element 59 closer to the plane of symmetry, giving rise to a differential radial displacement of the radial tips of elements 60, which accumulates for each pair of elements 59 and 60 up to a resulting radial displacement ε.

The bolts 63 engage the closing element 61 with precision, while to allow the radial expansion of the expander 57, they engage with the other elements 59 and 60 and with the radial extension 64 with gradually increasing play as the plane of symmetry α is approached.

The elastic element 66 inserted in a slot of the radial extension 64 and acting on a bolt 63 enables the radial recompaction of the expander 57 as the temperature drops. The expanders are mounted so as keep their projection inside the horizontal projection of the space occupied by the head 16 of the fuel elements 12 when cold, and to protrude from said projection only at high temperature when they perform their function.

The heads 16 of the fuel elements 12 are practically isothermal with the support structure 11 because they are immersed in the same blanket gas 50 of the reactor above level H1 of the primary coolant F and therefore always held rigidly in position. The feet 15 of the fuel elements are at the temperature of the cold manifold 7 and at the same temperature as the inner rim 20 of the opening 21 of the hydraulic separation structure 5, and can therefore be mounted with close tolerances. The fuel element is axially and radially constrained at the top and free to thermally expand downwards. As the power increases, the fuel element expands radially more at the grid 51 than at the foot 15. This differential expansion accumulates from the centre towards the outside of the core and is made possible: (i) by rotation of the foot 15 about its radial constraints constituted by the point of contact 67 with the feet of adjacent elements and/or with the inner rim 20 of the opening 21, (ii) by rotation of the shaft 17 of the fuel element 12 with respect to the head 16 by means of the spherical coupling 19, and (iii) by flexure of the shaft 17. This differential expansion can be amplified up to a predetermined value δ for activation of the expanders 57.

The action of the expanders 57 is countered by elastic elements that return the core to the compact configuration when, by cooling, the action of the expanders 57 terminates. In the example shown, the elastic element is constituted by the shaft 17 of the fuel element 12; in the case of a rigid fuel element, the radial elastic element could be constituted by the support structure 11, or by elastic return elements, not shown, interposed between the heads 16 of the fuel elements 12.

The shaft 17 is hollow, with a substantially tubular shape, and hydraulically connected to a tubular structure 68 that extends centrally for the entire active part 13 of the fuel elements 12.

The tubular structure 68 is characterized by a plurality of small holes 70 along the length corresponding to the active part 13 of the fuel element. The tubular structure 68 is conveniently closed at the bottom end 69 by a threaded coupling with a plug 71 that, together with a shoulder 72 made on the tubular structure 68, constitutes the locking system of the lower grid 73 of the fuel element 12. With a hydraulically sealed coupling between the grippers of the fuel replacement machine, both known solutions, and the head 16 of the fuel element 12, it is possible to inject cooling gas through the holes 70 of the tubular structure 68 and inside the active part 13 between the fuel rods 52 during fuel replacement operations.

The advantages of the present invention clearly emerge from the foregoing description:

The support grid of the core is eliminated or, in the case where it is maintained for radial positioning of the fuel elements, it loses its significance as a safety component.

The support devices 22 are an integral part of the fuel element 12 and replaced on each fuel replacement, together with the fuel element 12 to which they belong.

In the case of fuel elements 12 that extend significantly beyond the active part 13, the support devices 22 are not subjected to significant neutron damage and do not undergo significant thermal damage because they are positioned in a gas zone.

The horizontal support devices 24 enable fuel elements 12 to be installed without play, particularly important in fast reactors, and horizontal detachment of the heads 16 during fuel replacement with release of the gaps 39 in a way such that the fuel elements 12 can be easily extracted, even in the event of a deformed active part 13 and/or increased dimensions following neutron irradiation.

The absence of beams or grids overhanging the core 4 facilitates fuel replacement operations and the positioning of instrumentation cables for the core 4.

The mounting without play at the level of the foot 15, the upper grid 51 of the fuel rods 52 and the head 16, eliminates the risk of vibration in the fuel elements 12 and the associated effects of reactivity fluctuation in the core, which are exacting in the case of fast reactors.

When the devices 22 take part in fuel element replacement functions, they are operated via easily accessible actuators.

The seismic load of the head 16 of the fuel element discharges onto the support structure 11 and from this onto the closure structure 3, with no effect on the remaining part of the fuel element.

The possibility of expanding the active zone of the core introduces negative reactivity during heating transients.

The introduction of expanders 57 that, when the core outlet temperature exceeds a predetermined reference value, amplify the radial dilation of the core and the associated negative reactivity counter-reaction, introduces a safety factor in the design of the core.

The system of injecting cooling gas along the entire axial profile of the active part 13 of the fuel element cools the active part 13 even in a hypothetical situation where the fuel element remains blocked in a position of only partial extraction from the primary cooling fluid during the replacement operation; in this case, the active part 13 that has emerged from the cooling fluid F is cooled by gas escaping from the holes 70 that have emerged and which leaves the fuel element through the holes in the upper grid 51.

The injection of cooling gas inside the active part 13 favours cooling the inner fuel rods that, unlike the outer ones, cannot be efficiently cooled by outward irradiation from the active part 13.

Modifications and variants can be made regarding the reactor set forth herein without departing from the scope of the appended claims; in particular, depending on the project, the number, shape and position of the devices 22 can be modified, as can their function: devices that engage on the top, or on faces or in slots of the head 16 of adjacent fuel elements 12.

The invention claimed is:

1. A nuclear reactor, comprising:
a vessel;
a core housed in the vessel and including a bundle of fuel elements immersed in a primary cooling fluid of the core, each fuel element of the bundle of fuel elements including a head;
an anchoring structure including a plurality of slots;

wherein:
each fuel element of the bundle of fuel elements extends along a longitudinal axis parallel to the longitudinal axes of other fuel elements of the bundle of fuel elements;
the head of each fuel element of the bundle of fuel elements is mechanically secured to the head of one or more adjacent heads of fuel elements in the bundle of fuel elements; and
the bundle of fuel elements are secured to the anchoring structure by support devices securing adjacent fuel elements of the bundle of fuel elements and securing fuel elements of the bundle of fuel elements situated on a periphery of the core to the anchoring structure, the support devices including at least vertical support devices and horizontal support devices, each vertical support device of the vertical support devices including at least a body extending at least partially into the head and defining a longitudinal axis parallel to the longitudinal axis of the fuel element to which the vertical support device is secured, each of the horizontal support devices including:
a cylindrical body extending at least partially into the head of the fuel element to which the horizontal support device is secured and defining a longitudinal axis parallel to the longitudinal axis of the fuel element to which the horizontal support device is secured; and
a plurality of cams including an end distal to the cylindrical body of the horizontal support device and rotatable about the longitudinal axis defined by the cylindrical body of the horizontal support device between a closed position and an open position, the end being (1) in the closed position when the end is contained within a periphery of the head of the fuel element to which the cam is secured, and (2) in the open position when the end is at least one of protruding from the periphery of the head of the fuel element to which the cam is secured to contact the head of one or more adjacent fuel elements of the bundle of fuel elements or contact the anchoring structure.

2. The nuclear reactor of claim 1, wherein the vertical support devices each include a latch rotatably secured to the cylindrical body and having a tip distal to the cylindrical body that is rotatable about longitudinal axis of the cylindrical body between a closed position and an open position, the tip being (1) in the closed position when the tip is positioned over the head of the fuel element to which the vertical support is secured in the closed position, and (2) in the open position when the tip is at least one of positioned over the head of an adjacent fuel element of the bundle of fuel elements or inside a slot of the plurality of slots on the anchoring structure.

3. The nuclear reactor of claim 2, wherein when the vertical support devices secured to a fuel element of the bundle of the fuel elements are in a closed position and the horizontal support devices secured to the fuel element of the bundle of the fuel elements are in a closed position, the fuel element is extractable from the reactor for a fuel replacement operation.

4. The nuclear reactor of claim 3, wherein each fuel element of the bundle of fuel elements is configured, during the fuel replacement operation, to include at least one tip that extends over and rests on the head of an adjacent fuel element of the bundle of fuel elements when the vertical support devices on the fuel element is in an open position.

5. The nuclear reactor of claim 1, wherein the fuel element includes a flexible shaft that has an upper portion inserted in an empty cylindrical volume inside the head of the fuel element and mechanically coupled to the head by a spherical coupling.

6. The nuclear reactor of claim 1, further comprising a hydraulic separation structure having an inner rim defining an opening in its lower part, wherein each of the fuel elements of the bundle of fuel elements include feet and the feet of adjacent ones of the fuel elements are in contact with each other, wherein the bundle of fuel elements are constrained by contact between the feet of at least some of the fuel elements of the bundle of fuel elements and the inner rim of the opening in the lower part.

7. The nuclear reactor of claim 1, wherein each fuel element of the bundle of fuel elements includes a shaft and a plurality of expanders positioned on the shaft to expand the core when a predetermined temperature is exceeded.

8. The nuclear reactor of claim 7, wherein the plurality of expanders include alternately positioned low thermal expansion elements and high thermal expansion elements, the low thermal expansion elements being made of a first material having a first thermal expansion coefficient and the high thermal expansion elements being made of a second material having a second thermal expansion coefficient greater than the first thermal expansion coefficient.

9. The nuclear reactor of claim 6, wherein the core expands responsive to at least one of:
rotation of the feet of the fuel elements about radial constraints, the radial constraints including points of contact with at least one of (1) the feet of adjacent fuel elements of the bundle of fuel elements or (2) the inner rim of the opening;
rotation of the shaft of the fuel element with respect to the head by the spherical coupling; and
flexure of the shaft.

10. The nuclear reactor of claim 5, further comprising a tubular structure hydraulically connected at the bottom end of the shaft and extending for the an active part of each fuel element of the bundle of fuel elements;
wherein the shaft is hollow with a tubular shape and includes a bottom end distal to the head; and
wherein the tubular structure is hydraulically sealed at a bottom end of the tubular structure and includes a plurality of holes along a length corresponding to the active part of the fuel element.

11. The nuclear reactor of claim 10, wherein:
the tubular structure includes a bottom end having a shoulder and a reduced diameter at the shoulder; and
the nuclear reactor includes a plug that closes the bottom end of the tubular structure and, together with the shoulder, form a locking system of a lower grid of each fuel element of the bundle of fuel elements.

12. The nuclear reactor of claim 1, wherein each of the vertical support devices includes a latch secured to a cylindrical body and rotatable about the longitudinal axis defined by the cylindrical body.

13. The nuclear reactor of claim 1, wherein the support devices further include horizontal support devices, each of the horizontal support devices including a cylindrical body extending at least partially into the head of the fuel element to which the horizontal support device is secured and defining a longitudinal axis parallel to the longitudinal axis of the fuel element to which the horizontal support device is secured.

14. The nuclear react of claim 13, wherein each of the horizontal support devices includes one or more cams having an end distal to the cylindrical body of the horizontal support device and being rotatable about the longitudinal axis defined by the cylindrical body of the horizontal support device.

* * * * *